United States Patent [19]
Hemingway

[11] Patent Number: 5,894,265
[45] Date of Patent: Apr. 13, 1999

[54] DRIVING CONDITION DEPENDENT BRAKING LIGHT

[76] Inventor: David Hemingway, Lock Keepers House, Temple Lock Marlow, Buckinghamshire, SL71SA, United Kingdom

[21] Appl. No.: 09/019,021

[22] Filed: Feb. 5, 1998

[51] Int. Cl.[6] ............................................ B60Q 1/44
[52] U.S. Cl. ...................... 340/479; 340/464; 340/467; 340/459
[58] Field of Search ................................ 340/463, 464, 340/467, 468, 479, 459, 469, 522; 318/DIG. 2

[56] References Cited

U.S. PATENT DOCUMENTS

| | | | |
|---|---|---|---|
| 4,222,044 | 9/1980 | Boschung | 340/581 |
| 4,492,952 | 1/1985 | Miller | 340/459 |
| 5,231,373 | 7/1993 | Freeman et al. | 340/479 |
| 5,410,294 | 4/1995 | Gold | 340/467 |
| 5,563,577 | 10/1996 | Adkins | 340/426 |
| 5,610,578 | 3/1997 | Gilmore | 340/479 |
| 5,619,182 | 4/1997 | Robb | 340/479 |
| 5,663,706 | 9/1997 | Francis | 340/467 |
| 5,729,105 | 3/1998 | Droge | 318/DIG. 2 |
| 5,729,106 | 3/1998 | Pientke et al. | 318/DIG. 2 |
| 5,786,752 | 7/1998 | Bucalo et al. | 340/463 |

*Primary Examiner*—Jeffery A. Hofsass
*Assistant Examiner*—Anh La

[57] ABSTRACT

A dangerous condition indicating brake light system is provided including a brake switch adapted to transmit an activation signal only during the depression of a brake pedal. An outside temperature sensor is mounted on an exterior of the vehicle for transmitting a condition signal upon the detection of a temperature below a predetermined amount. A light is situated on a rear extent of the vehicle and adapted to illuminate only upon the actuation thereof. Control circuitry is provided for actuating the light upon the receipt of the condition signal in combination with the activation signal.

7 Claims, 2 Drawing Sheets

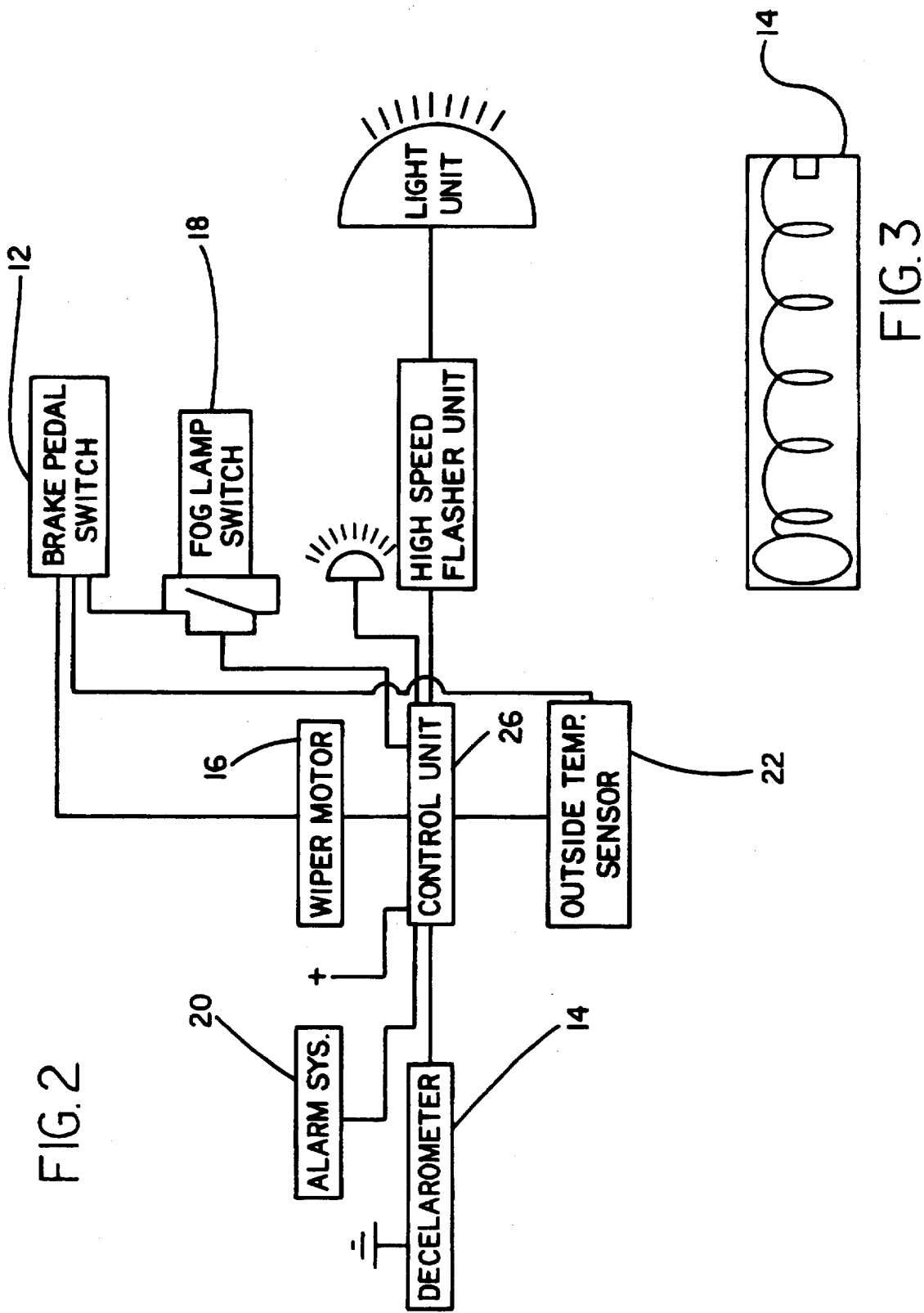

DRIVING CONDITION DEPENDENT BRAKING LIGHT

BACKGROUND OF THE INVENTION

1. Field of the Invention

The present invention relates to variable brake indicator light systems and more particularly pertains to a new driving condition dependent braking light for indicating when a brake is applied under certain predetermined external driving conditions.

2. Description of the Prior Art

The use of variable brake indicator light systems is known in the prior art. More specifically, variable brake indicator light systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art variable brake indicator light systems include U.S. Pat. No. 4,663,609; U.S. Pat. No. 4,843,368; U.S. Pat. No. 5,404,130; U.S. Pat. No. 4,922,231; U.S. Pat. No. 5,059,947; and U.S. Pat. No. Des. 332,234.

In these respects, the driving condition dependent braking light according to the present invention substantially departs from the conventional concepts and designs of the prior art, and in so doing provides an apparatus primarily developed for the purpose of indicating when a brake is applied under certain predetermined external driving conditions.

SUMMARY OF THE INVENTION

In view of the foregoing disadvantages inherent in the known types of variable brake indicator light systems now present in the prior art, the present invention provides a new driving condition dependent braking light construction wherein the same can be utilized for indicating when a brake is applied under certain predetermined external driving conditions.

The general purpose of the present invention, which will be described subsequently in greater detail, is to provide a new driving condition dependent braking light apparatus and method which has many of the advantages of the variable brake indicator light systems mentioned heretofore and many novel features that result in a new driving condition dependent braking light which is not anticipated, rendered obvious, suggested, or even implied by any of the prior art variable brake indicator light systems, either alone or in any combination thereof.

To attain this, the present invention generally comprises a brake pedal switch adapted to transmit an activation signal only during the depression of a brake pedal. Situated within the vehicle is a decelarometer adapted to transmit a condition signal upon the detection of a deceleration of the vehicle which exceeds a predetermined amount. Further provided is a wiper motor switch for transmitting the condition signal upon the detection of the actuation of a set of windshield wipers of the vehicle. For detecting hazardous weather conditions similar to the wiper motor switch, a fog light switch is provided. The fog light switch serves for transmitting the condition signal upon the detection of the actuation of a set of fog lights of the vehicle. Next provided is a vehicular alarm situated within the vehicle and adapted to generate the condition signal upon the detection of the unauthorized tampering of the vehicle. An outside temperature sensor is mounted on an exterior of the vehicle. The outside temperature sensor is adapted for transmitting the condition signal upon the detection of a temperature below a predetermined amount. Situated on a rear extent of the vehicle is a light adapted to illuminate only upon the actuation thereof. In a first embodiment, the light comprises of a conventional brake light. Finally, control circuitry is connected between the brake pedal switch, decelarometer, wiper motor switch, fog light switch, vehicular alarm, outside temperature sensor, and light. In use, the control circuitry has a first mode of operation during the receipt of only the activation signal. In such mode, the light is continuously actuated during the receipt of the activation signal. The control circuitry further has a second mode operation upon the receipt of the condition signal in combination with the activation signal. In the second mode operation, the control circuitry is adapted for intermittently actuating the light during their simultaneous receipt for a predetermined time.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new driving condition dependent braking light apparatus and method which has many of the advantages of the variable brake indicator light systems mentioned heretofore and many novel features that result in a new driving condition dependent braking light which is not anticipated, rendered obvious, suggested, or even implied by any of the prior art variable brake indicator light systems, either alone or in any combination thereof.

It is another object of the present invention to provide a new driving condition dependent braking light which may be easily and efficiently manufactured and marketed.

It is a further object of the present invention to provide a new driving condition dependent braking light which is of a durable and reliable construction.

An even further object of the present invention is to provide a new driving condition dependent braking light which is susceptible of a low cost of manufacture with regard to both materials and labor, and which accordingly is then susceptible of low prices of sale to the consuming public, thereby making such driving condition dependent braking light economically available to the buying public.

Still yet another object of the present invention is to provide a new driving condition dependent braking light which provides in the apparatuses and methods of the prior art some of the advantages thereof, while simultaneously overcoming some of the disadvantages normally associated therewith.

Still another object of the present invention is to provide a new driving condition dependent braking light for indicating when a brake is applied under certain predetermined external driving conditions.

Even still another object of the present invention is to provide a new driving condition dependent braking light that includes a brake switch adapted to transmit an activation signal only during the depression of a brake pedal. An outside temperature sensor is mounted on an exterior of the vehicle for transmitting a condition signal upon the detection of a temperature below a predetermined amount. A light is situated on a rear extent of the vehicle and adapted to illuminate only upon the actuation thereof. Control circuitry is provided for actuating the light upon the receipt of the condition signal in combination with the activation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a more detailed schematic diagram of the present invention.

FIG. 3 is an illustration of the decelarometer of the present invention.

DESCRIPTION OF THE PREFERRED EMBODIMENT

Figure 1:
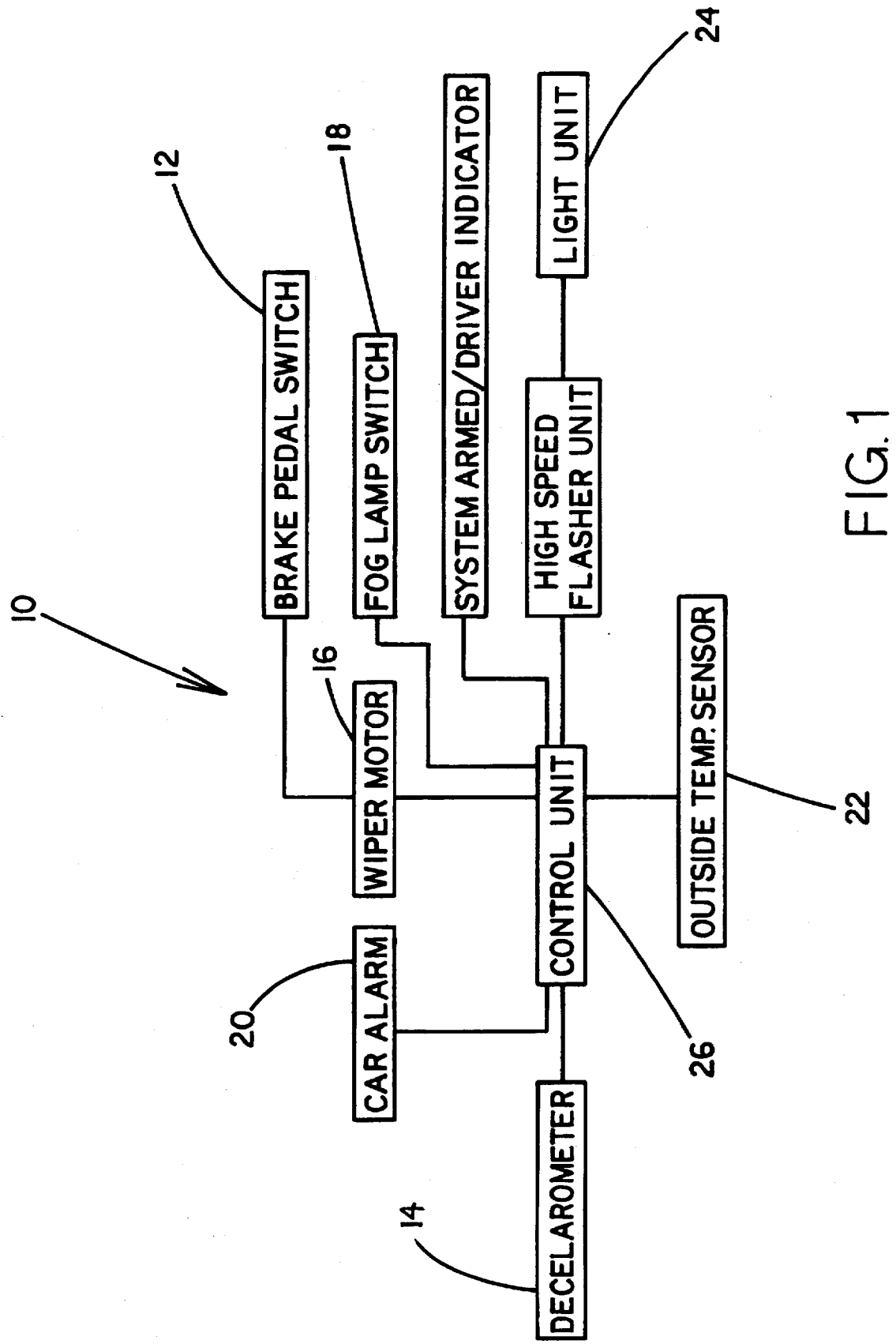
FIG. 1 is a schematic diagram of a new driving condition dependent braking light according to the present invention.

With reference now to the drawings, and in particular to FIGS. 1 through 2 thereof, a new driving condition dependent braking light embodying the principles and concepts of the present invention and generally designated by the reference numeral 10 will be described.

The present invention, designated as numeral 10, includes a brake pedal switch 12 adapted to transmit an activation signal only during the depression of a brake pedal. Situated within a vehicle is a decelarometer 14 adapted to transmit a condition signal upon the detection of a deceleration of the vehicle which exceeds a predetermined amount. Such decelarometer preferably comprises a tube in which a spring biased ball resides on a side opposite of a switch. The spring constant of the spring and the weight of the ball are determined such that the switch is closed when the predetermined amount of deceleration is exceeded.

Further provided is a wiper motor switch 16 for transmitting the condition signal during the detection of the actuation of a set of windshield wipers of the vehicle in a high speed mode. For detecting hazardous weather conditions similar to the wiper motor switch, a fog light switch 18 is provided. The fog light switch serves for transmitting the condition signal during the detection of the actuation of a set of fog lights of the vehicle.

Next provided is a vehicular alarm 20 situated within the vehicle and adapted to generate the condition signal upon the detection of the unauthorized tampering, of the vehicle. An outside temperature sensor 22 is mounted on an exterior of the vehicle. The outside temperature sensor is adapted for transmitting the condition signal upon the detection of a temperature below a predetermined amount of 32 degrees F. As such, the outside temperature sensor is adapted to detect the potential for icy road conditions.

Situated on a rear extent of the vehicle is a light 24 adapted to illuminate only upon the actuation thereof. In a first embodiment, the light comprises of a conventional brake light. In various other embodiments, hazard lights or a separate auxiliary light such as a diode array may be employed.

Finally, control circuitry 26 is connected between the brake pedal switch, decelarometer, wiper motor switch, fog light switch, vehicular alarm, outside temperature sensor, and light. In use, the control circuitry has a first mode of operation during the receipt of only the activation signal. In such mode, the light is continuously actuated during the receipt of the activation signal. As such, in the first embodiment, the vehicle brake light operates conventionally.

The control circuitry further has a second mode operation upon the receipt of the condition signal in combination with the activation signal. In the second mode operation, the control circuitry is adapted for intermittently actuating the light for a predetermined time. The light is ideally actuated 5 times/second for 4 seconds when the conditions for the second mode of operation are met. Preferably, the control circuitry operates in the second mode of operation unconditionally upon the receipt of the activation signal from the decelarometer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dangerous condition indicating brake light system comprising, in combination:

a brake pedal switch adapted to transmit an activation signal only during the depression of a brake pedal;

a decelarometer situated within the vehicle and adapted to transmit a condition signal independent of the depression of the brake pedal upon the detection of a deceleration of the vehicle which exceeds a predetermined amount, wherein the decelarometer includes a tube in which a spring biased ball resides on a side opposite of a switch with a spring constant of the spring and a weight of the ball being such that the switch is closed when the predetermined amount of deceleration is exceeded;

a wiper motor switch for transmitting the condition signal upon the detection of the actuation of a set of windshield wipers of the vehicle;

a fog light switch for transmitting the condition signal upon the detection of the actuation of a set of fog lights of the vehicle;

a vehicular alarm situated within the vehicle and adapted to generate the condition signal upon the detection of the unauthorized tampering of the vehicle;

an outside temperature sensor mounted on an exterior of the vehicle for transmitting the condition signal upon the detection of a temperature below a predetermined amount;

a light situated on a rear extent of the vehicle and adapted to illuminate only upon the actuation thereof; and control circuitry connected between the brake pedal switch, decelarometer, wiper motor switch, fog light switch, vehicular alarm, outside temperature sensor, and light, the control circuitry having a first mode of operation during the receipt of only the activation signal wherein the light is continuously actuated, the control circuitry further having a second mode of operation upon the receipt of the condition signal in combination with the activation signal for intermittently actuating the light during their simultaneous receipt for a predetermined time of about 4 seconds;

wherein the control circuitry operates in the second mode upon the receipt of the condition signal from the decelarometer independent of the receipt of the activation signal.

2. A dangerous condition indicating brake light system comprising:

a brake switch adapted to transmit an activation signal only during the depression of a brake pedal;

an outside temperature sensor mounted on an exterior of the vehicle for transmitting a condition signal upon the detection of a temperature below a predetermined amount;

a decelarometer situated within the vehicle and adapted to transmit the condition signal independent of the depression of the brake pedal upon the detection of a deceleration of the vehicle which exceeds a predetermined amount;

a wiper motor switch for transmitting the condition signal upon the detection of the actuation of a set of windshield wipers of the vehicle;

a fog light switch for transmitting the condition signal upon the detection of the actuation of a set of fog lights of the vehicle;

a light situated on a rear extent of the vehicle and adapted to illuminate only upon the actuation thereof; and control circuitry having a first mode of operation during the receipt of only the activation signal wherein the light is continuously actuated, the control circuitry further having a second mode of operation upon the receipt of the condition signal in combination with the activation signal for intermittently actuating the light during their simultaneous receipt for a predetermined time.

3. A dangerous condition indicating brake light system as set forth in claim 2 wherein the light is a hazard light.

4. A dangerous condition indicating brake light system as set forth in claim 2 wherein the light is an auxiliary light.

5. A dangerous condition indicating brake light system as set forth in claim 2 and further including a vehicular alarm adapted to generate the condition signal upon the detection of the unauthorized tampering of the vehicle.

6. A dangerous condition indicating brake light system as set forth in claim 2 wherein the control circuitry operates in the second mode upon the receipt of the condition signal from the decelarometer independent of the receipt of the activation signal.

7. A dangerous condition indicating brake light system as set forth in claim 2 wherein the decelarometer includes a tube in which a spring biased ball resides on a side opposite of a switch with a spring constant of the spring and a weight of the ball being such that the switch is closed when the predetermined amount of deceleration is exceeded.

* * * * *